No. 681,153. Patented Aug. 20, 1901.
D. E. THOMSON.
MANUFACTURE OF INLAID LINOLEUM.
(Application filed July 18, 1896.)

(No Model.) 13 Sheets—Sheet 1.

Fig. 1

Witnesses: Herbert Bradley

Inventor: David E. Thomson
By Knight Bros attys.

No. 681,153. Patented Aug. 20, 1901.
D. E. THOMSON.
MANUFACTURE OF INLAID LINOLEUM.
(Application filed July 13, 1896.)
(No Model.) 13 Sheets—Sheet 5.

No. 681,153. Patented Aug. 20, 1901.
D. E. THOMSON.
MANUFACTURE OF INLAID LINOLEUM.
(Application filed July 13, 1896.)
(No Model.) 13 Sheets—Sheet 6.

No. 681,153. Patented Aug. 20, 1901.
D. E. THOMSON.
MANUFACTURE OF INLAID LINOLEUM.
(Application filed July 13, 1896.)
(No Model.) 13 Sheets—Sheet 7.

Attest:
Jas. W. White
W. Ellwood Allen

Inventor:
David Esplin Thomson.
By Knight Bros
Attys.

No. 681,153. Patented Aug. 20, 1901.
D. E. THOMSON.
MANUFACTURE OF INLAID LINOLEUM.
(Application filed July 13, 1896.)
(No Model.) 13 Sheets—Sheet 8.

Fig. 5.

No. 681,153. Patented Aug. 20, 1901.
D. E. THOMSON.
MANUFACTURE OF INLAID LINOLEUM.
(Application filed July 13, 1896.)
(No Model.) 13 Sheets—Sheet 9.

Attest.
Jas W White
N. Ellwood Allen

Inventor.
David Esplin Thomson.
By Knight Bros
Attys.

No. 681,153. Patented Aug. 20, 1901.
D. E. THOMSON.
MANUFACTURE OF INLAID LINOLEUM.
(Application filed July 18, 1896.)
(No Model.) 13 Sheets—Sheet 10.

Attest:
Jas. W. White
W. Ellwood Allen.

Inventor:
David Esplin Thomson.
By Knight Bros
Attys.

No. 681,153. Patented Aug. 20, 1901.
D. E. THOMSON.
MANUFACTURE OF INLAID LINOLEUM.
(Application filed July 13, 1896.)

(No Model.) 13 Sheets—Sheet 11.

Attest:
Jas W White
F. Ellwood Allen.

Inventor.
David Esplin Thomson.
By Knight Bros
Attys.

No. 681,153. Patented Aug. 20, 1901.
D. E. THOMSON.
MANUFACTURE OF INLAID LINOLEUM.
(Application filed July 13, 1896.)
(No Model.) 13 Sheets—Sheet 12.

Attest.
Jas. W. White
W. Ellwood Allen.

Inventor.
David Esplin Thomson.
By Knight Bros
Attys.

UNITED STATES PATENT OFFICE.

DAVID ESPLIN THOMSON, OF EDINBURGH, SCOTLAND.

MANUFACTURE OF INLAID LINOLEUM.

SPECIFICATION forming part of Letters Patent No. 681,153, dated August 20, 1901.

Application filed July 13, 1896. Serial No. 599,019. (No model.)

*To all whom it may concern:*

Be it known that I, DAVID ESPLIN THOMSON, engineer, of Gillespie Street Works, Gilmore Place, Edinburgh, in the county of Mid-Lothian, Scotland, have invented Improvements in the Manufacture of Inlaid Linoleum and the Like and Apparatus Connected Therewith, (for which Letters Patent of Great Britain have been granted me, No. 16,376, dated the 28th day of December, 1894,) of which the following is a specification.

The object of this invention is to provide a machine for cutting out and building patterns from substances, such as linoleum, which can be formed into sheets. The machine may be arranged to make the complete sheet by combination of a primary perforated sheet and the insertion therein of pieces of various forms and colors or otherwise by dispensing with the perforated primary sheet and using pieces of various forms and colors to compose the entire pattern. In the former case the primary sheet would be colored all over suitably for the ground and the pattern would be inlaid. In the latter it would be entirely built. In both cases the linoleum would be fixed to a canvas backing. For this purpose I provide a traveling platen or table, which is caused to travel intermittently a distance equal to the length of the pattern to be produced, said table carrying with it the canvas backing upon which the pieces of linoleum or tesseræ are to be laid. On a suitable framing and at a convenient height above said table are sets of rollers, (as many sets as there are colors in the pattern,) between each set of which there passes a prepared continuous sheet of suitable color to form the mosaic. In the said framing and arranged in suitable guides are carried sets of heads fixed on beams. On said heads are fixed a series of cutters or die-plates, each cutter corresponding to the part of one color of the pattern. Loosely fitted inside said cutters and attached to a sliding block are fixed ejectors, which eject the tesseræ from the cutters and press them onto the canvas backing, said sliding block being carried in suitable guides attached to the beam. The beam which carries the cutters is hung on trunnions and is free to be turned by suitable mechanism from a horizontal to a vertical position, and vice versa. When said beam is held in the horizontal position, another beam, to which is attached a soft-metal facing and also a guide-plate and which carries the sheet of linoleum with it, is moved toward the cutter-beam and presses the cutters through the sheet of linoleum. The beam is then drawn back, carrying the sheet of linoleum with it. The cutter-beam is then turned from the horizontal to the vertical position and the tesseræ ejected from the cutters and pressed onto the canvas backing. During the time that the cutter-beam is being turned from the vertical to the horizontal position the sheet of linoleum is moved (by suitable mechanism) downward or across the cutter-beam in readiness for the next movement of the cutting-block. After the pattern has been completed the whole is drawn under a hydraulic press and is subjected to a pressure sufficient to make the pieces of mosaic cohere and adhere to the canvas backing. The sheet of mosaic is then carried between rollers (which may be heated) which give it a further and finishing pressure.

This invention is for the manufacture of two styles of mosaic—*i. e.*, that in which there is a continuous sheet of linoleum with perforations made in it and then filled up with a pattern of one or more colors, the whole being fixed to a canvas backing, and the other that in which the whole sheet of mosaic is made up of tesseræ of different forms and colors fixed to a canvas backing.

The accompanying drawings will enable my invention to be fully understood.

Figures 1 and 1$^a$ taken together are a longitudinal section. Figs. 2 and 2$^a$ taken together are a side elevation. Figs. 4 and 4$^a$ taken together are a sectional plan, certain parts being removed.

In the several figures the same letters of reference indicate corresponding parts.

$a$ is the roll of the primary or foundation sheet $a^x$ of the finished article.

$b\ b'$ are rollers of secondary sheets of different colors; $a'$, Fig. 3, the strip of linoleum to form the selvage or edge of the sheet.

$C$ is the framing, which is formed in sections; $C'$ and $C^2$, the girders which support the traveling table and take the stress during the operation of pressing the tesseræ onto the canvas backing. These girders are provided with a chamber, so that they may be heated with steam, if necessary.

$c^3$ and $c^4$ are the drums for carrying the traveling table $c^5$, which is moved intermittently by means of the ratchet-wheel $c^6$ and pawl $c^7$, Fig. 2$^a$.

$c^8$ represents the shafts, journaled in the pedestals $p^9\ p^{10}$, for carrying the drums $c^3\ c^4$ and ratchet-wheel $c^6$.

$d$ is the beam or head for carrying the primary-sheet cutters or dies $d'$, which are fixed to a block $d^2$. The beam is moved upward and downward by means of the toggle-joints $d^3$, which are attached to box-slides $d^4$, suitably supported in the frame of the machine and operated by cams $d^5$.

$d^6$ is a girder which forms the cutting-table for the primary sheet, the said table preferably covered with a soft-metal facing.

$e\ e'$ are the beams or heads for carrying the secondary-sheet cutters or dies $e^2$, which are fixed to removable blocks $e^3\ e^4$. The beams $e\ e'$ are hung on trunnions $e^5$ and are turned from a horizontal to a vertical position by means of levers $e^6$, respectively, each lever $e^6$ being provided at one end with a link $e^7$, attached to the beam $e$, and at the other end provided with a link $e^8$, attached to a box-slide $e^9$, operated by a cam $e^{10}$, mounted on spindles, such spindles being journaled in bearings secured to the frame of the machine, as clearly shown in Fig. 1.

$f\ f'$ are the cutting-tables for secondary sheets $b\ b'$, respectively, said tables being covered with a soft-metal facing $f^2$, Fig. 4. Attached to the tables, but adjustable, are guide-plates $f^3$ for guiding the cutters. The tables $f\ f'$ are moved backward and forward by means of toggle-joints $f^4$, attached to box-slides $f^5$ and operated by cams $f^6$ and $f^7$. By this means the dies $e^2$ cut out and carry the pieces of linoleum. The beams $e\ e'$ are then turned to the vertical position above the primary sheet and the pieces of linoleum are ejected from the dies $e^2$ by means of the ejectors $g'\ g^2$, &c.

Figure 9:
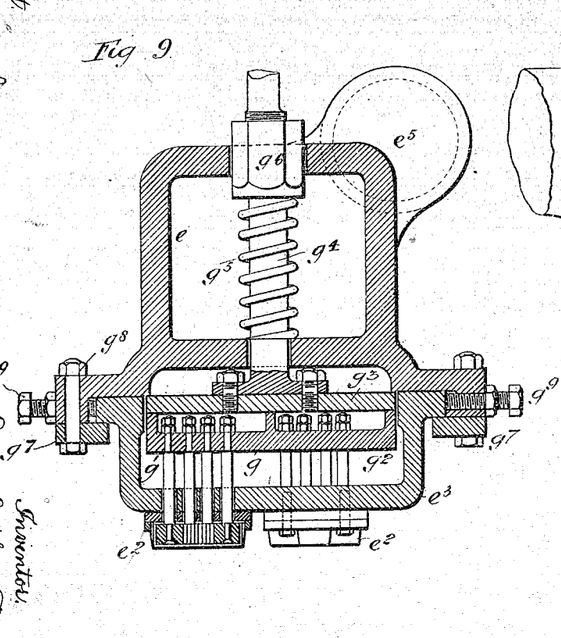
Figs. 9 and 10 are views of the pattern-cutting block on a larger scale.
Figure 10:
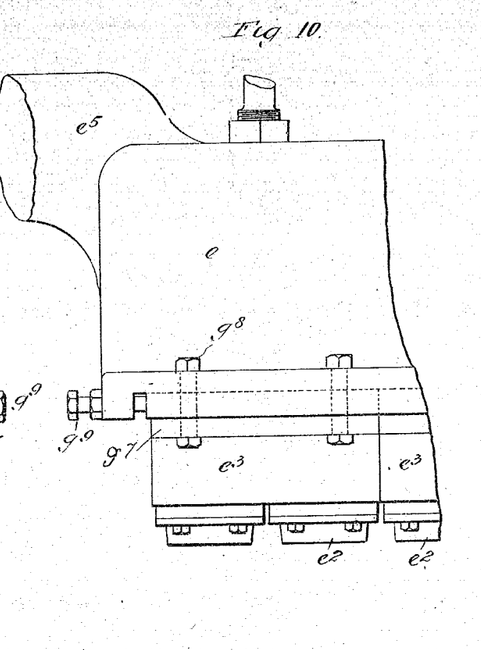

$g^3$, Figs. 9 and 10, is a plate attached to the rod $g^4$, said rod and plate being kept in position by means of the spring $g^5$ and adjustable nut $g^6$. These rods are operated by the beam $h$, Fig. 5, said beam being controlled by the eccentric cam $h^2$, Fig. 1.

$g$ is the ejector-plate, which is bolted to the plate $g^3$ and carries the ejectors $g'\ g^2$, &c.

The movable blocks $e^3$, with dies $e^2$, are fixed to the beam $e$ by means of the guide-plates $g^7$ and bolts $g^8$ and are adjusted by bolts $g^9$, Figs. 9 and 10.

Figure 1:
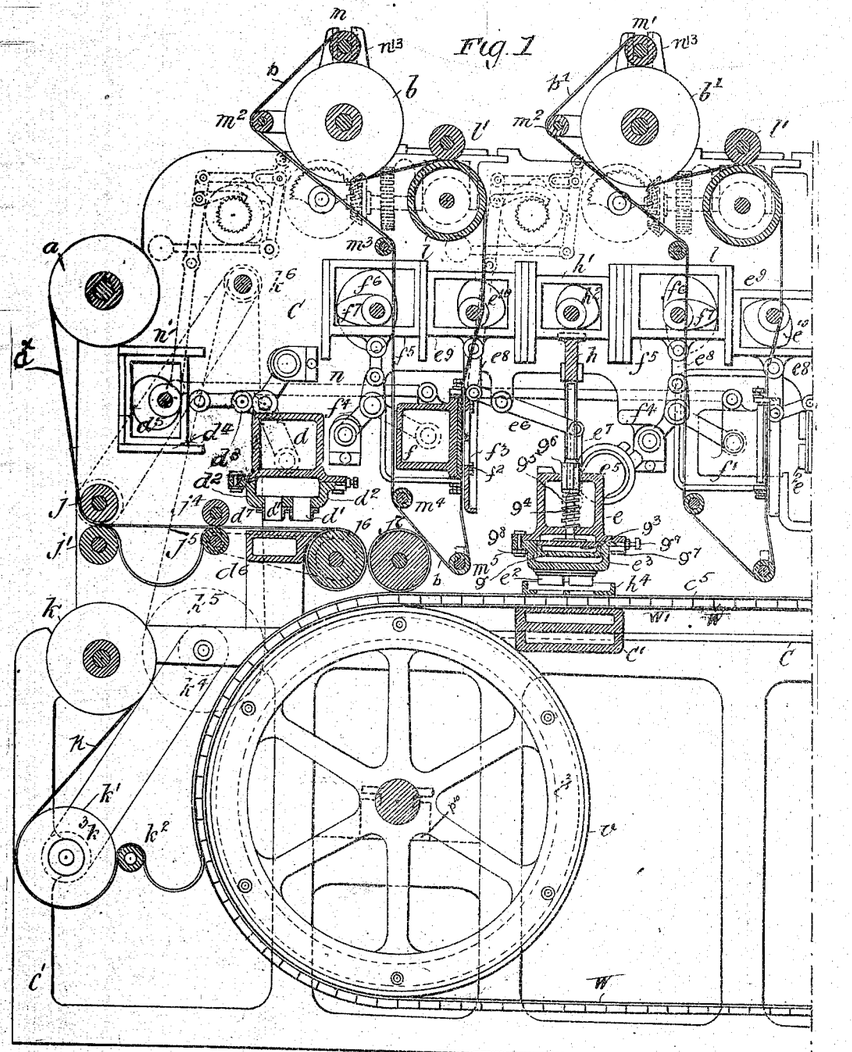
Figure 5:
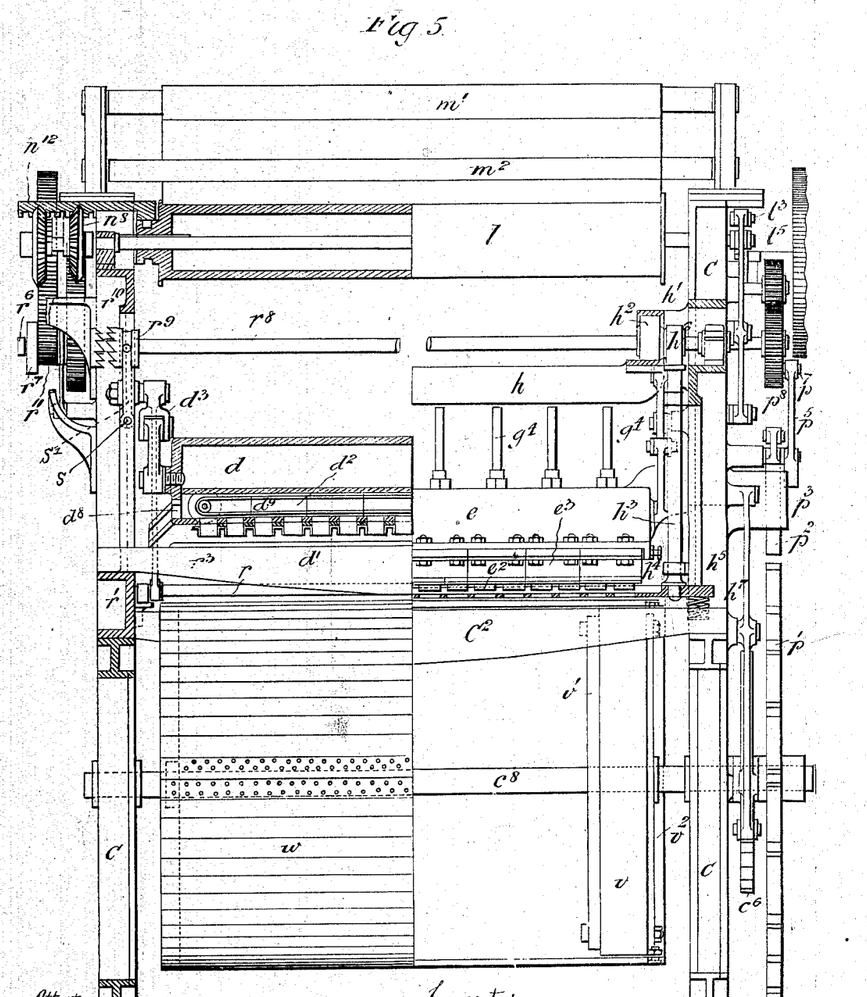
Fig. 5 is a sectional elevation showing part of pattern-cutting block, section of primary cutting-block, and rollers for feeding linoleum web to cutter-block.

$h$, Figs. 1 and 5, is a beam which is attached to box-slides $h'$ and operated by means of cams $h^2$.

$h^3$ represents guide-rods connected to each end of the pattern-plate $h^4$, said guide-rods being held in position by suitable guides $h^5$, fixed to the framing $C$, the end of the pattern-plate $h^4$ being shown in elevation in Figs. 1$^a$ and 2$^a$. The guide-rods and pattern-plate are pressed downward by means of the cam $h^6$ (located by the side of cam $h^2$, as best seen in Fig. 5) and are lifted up by the springs $h^7$.

Figure 2:
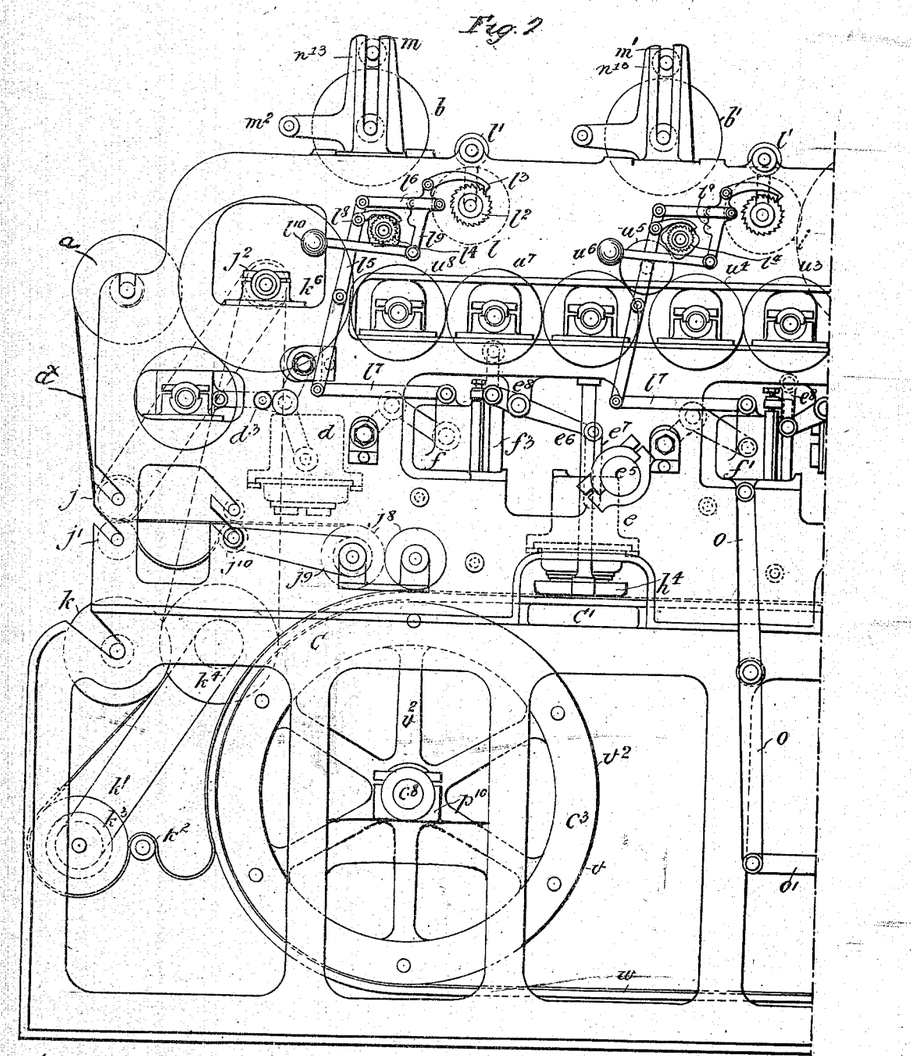
Figure 2A:
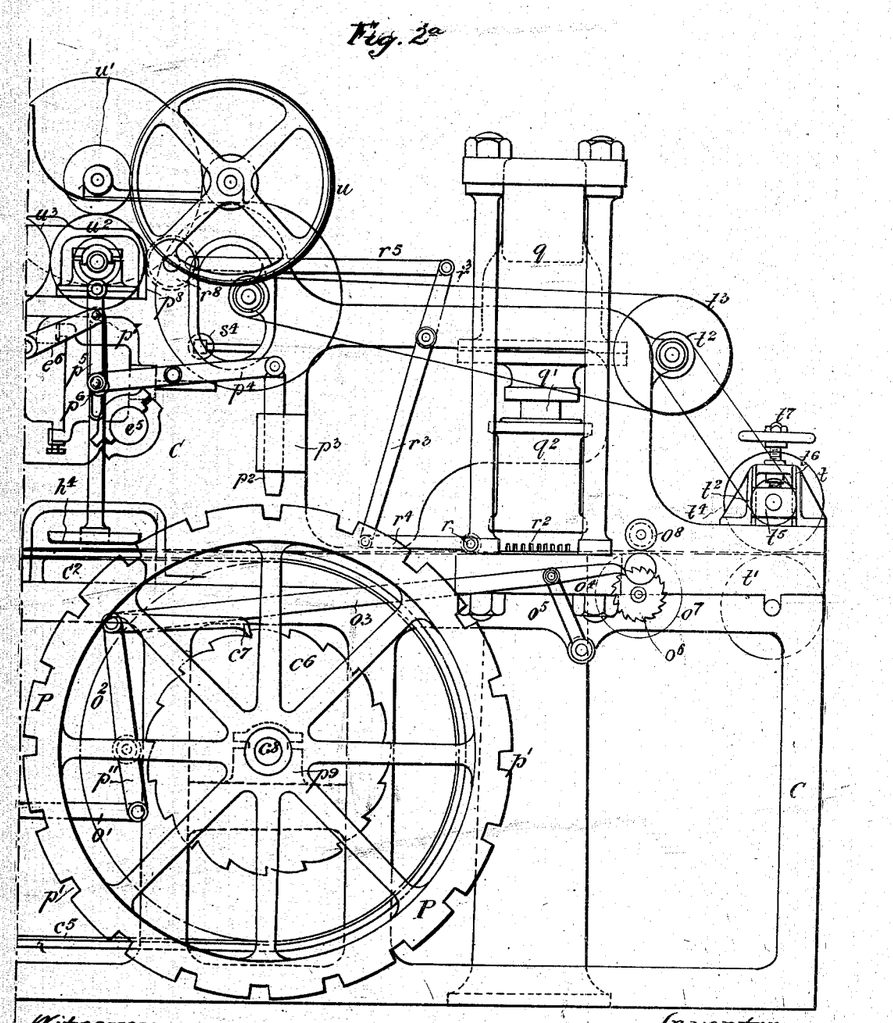
Figure 3:
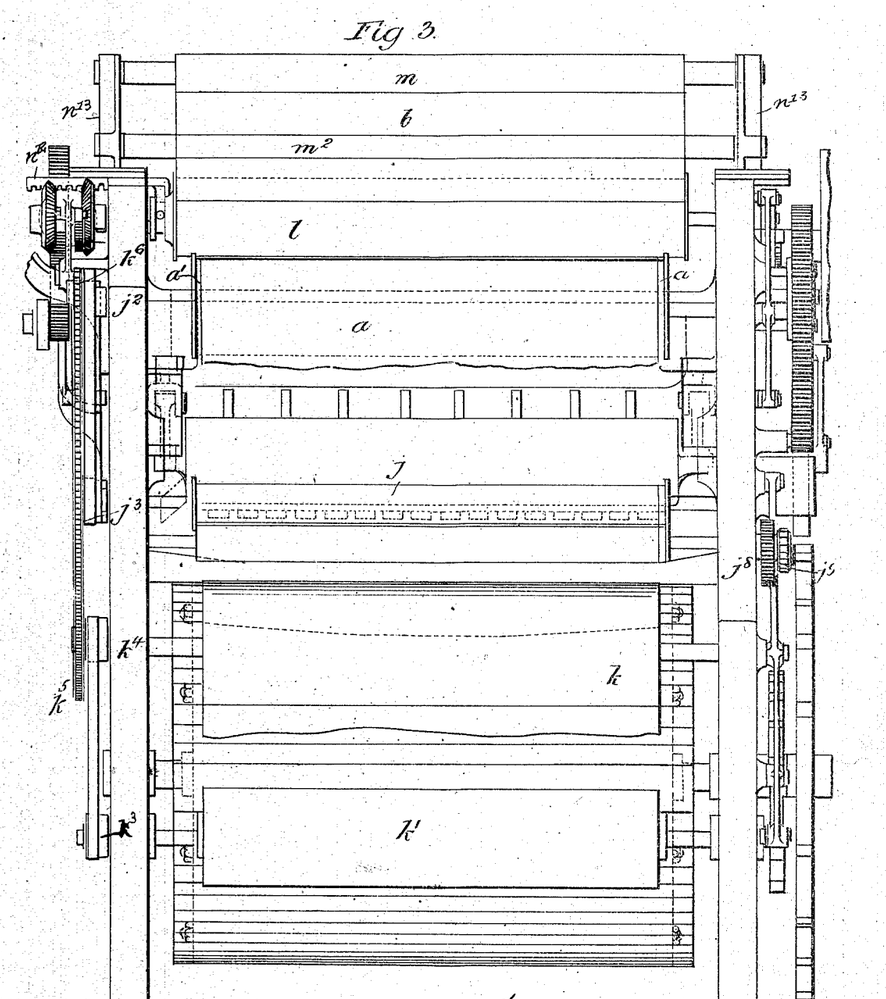
Fig. 3 is a front end elevation.

$j\ j'$, Figs. 1 and 2, are rollers for taking the primary sheet from roll $a$ and are driven at a constant speed by means of pulleys $j^2\ j^3$, Fig. 3.

$j^4$ and $j^5$ are rollers for guiding the sheet onto the cutting-block.

$j^6$ and $j^7$ are rollers provided with frictional surfaces which grip the perforated primary web and are driven intermittently by the friction between the traveling table $c^5$ and the roller $j^7$, which in turn drives the roller $j^6$, and the roller $j^6$ drives the roller $j^5$ by means of the spur-wheels $j^8$ and sprocket-wheels $j^9$ and $j^{10}$, connected by means of a drive-chain. (Shown in outline.)

$k$ is the sheet or roll of canvas; $k'$, the steam-cylinder around which the web of canvas is passed.

$k^2$ is the guide-roller for the canvas web.

The cylinder $k'$ is driven at a constant speed by means of the cones $k^3\ k^4$ and chain-wheels $k^5\ k^6$, Figs. 1 and 3.

Figures 21, 22, 23, 24:
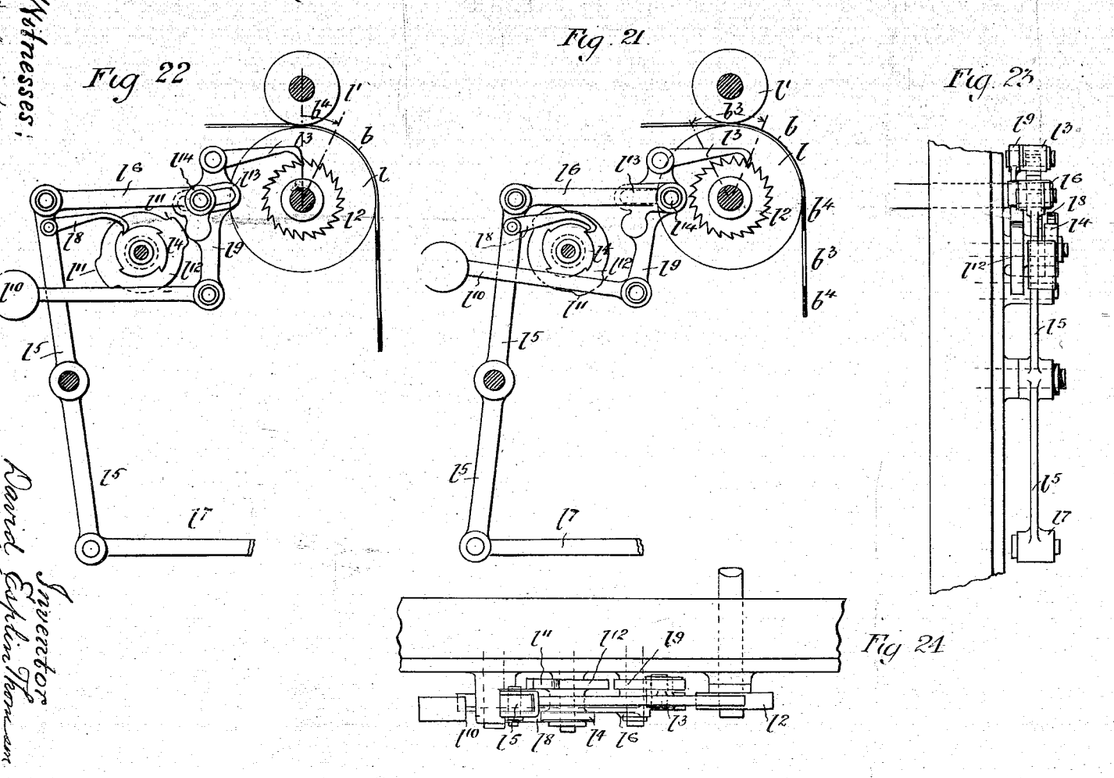
Fig. 21 is a detail view of the mechanism for giving the downward movement to the secondary sheet of linoleum, the mechanism being shown in its position after completing the forward movement.
Fig. 22 is a detail view of said mechanism in position after beginning the forward movement.
Figs. 23 and 24 are respectively a side view and a plan of said mechanism.

In Figs. 1, 21, and 22, $l\ l'$ are the guide-rollers for giving the downward movement to the secondary sheet $b$ and which are driven intermittently by means of the ratchet-wheel $l^2$, Figs. 21 and 22, and pawl $l^3$, the movement of the pawl $l^3$ being regulated by the ratchet-wheel $l^4$ and cam $l^{12}$.

$l^3$ is the pawl which moves the ratchet-wheel $l^4$, said wheel $l^4$ being fixed on the same spindle as cam $l^{12}$, said cam regulating, by means of projections $l^{11}$, the movement of the lever $l^9$. The pawl $l^3$ is attached to and gets its movement from the rocking lever $l^5$, which is attached to the connecting-rod $l^7$, said rod being fixed to and getting its motion from the cutting-table $f$, Fig. 2.

In Fig. 21 the lever $l^5$ is shown as having completed the end of its stroke, carrying forward lever $l^9$ and pawl $l^3$ and moving the ratchet-wheel $l^2$, with the roller $l$, through an angle $b^3$, thus moving the secondary sheet $b$ downward an amount equal to $b^3$. By means of the slot $l^{13}$ in lever $l^9$, pin $l^{14}$ in lever $l^5$, and the projections $l^{11}$ on the cam $l^{12}$ a varying movement can be given to the pawl $l^3$.

Fig. 22 shows the return or backward position of the lever $l^5$, which has moved the mechanism backward in readiness for the forward movement. The pawl $l^3$ has moved the ratchet-wheel $l^4$ and cam $l^{12}$ into such a position that the projection $l^{11}$ is turned around through an angle of ninety degrees. At the same time the weighted lever $l^{10}$ has drawn backward the lever $l^9$, which stops or rests on the projection $l^{11}$, said lever $l^9$ only moving through a part of its stroke and the pawl $l^3$ falling into the ratchet-wheel $l^2$ in such a position that in the forward movement of the lever $l^9$ the wheel $l^2$ and roller $l$ only move through an angle $b^4$, thus moving the secondary sheet $b$ downward an amount equal to $b^4$. It is clearly to be seen that by putting on cams $l^{12}$ with varying projections $l^{11}$ that the lever $l^9$ may either remain at rest or move through any angle up to the maximum $b^3$, and thus varying the downward movement of the secondary sheet.

$m^2$ $m^3$ $m^4$ $m^5$ are guide-rollers for the sheets $b$ $b'$, whereby the mutilated secondary sheet is guided to the waste-rollers $m$ $m'$, Fig. 1.

Figures 6, 7:
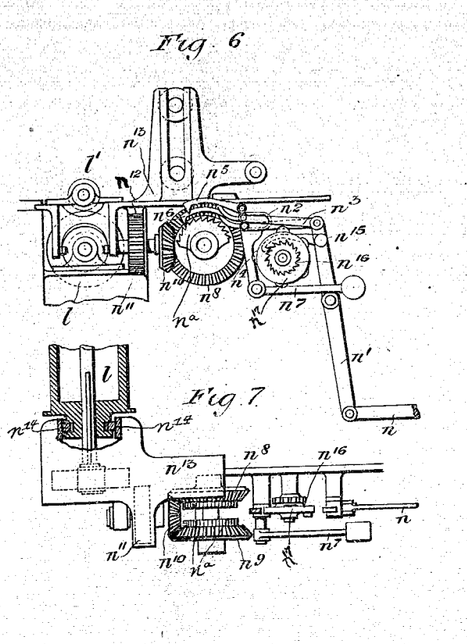
Figs. 6 and 7 are views of the gearing for giving the transverse motion to the rollers for feeding linoleum web to the cutters.

For giving a transverse movement to the secondary sheets, Figs. 1, 6, and 7, $n$ is the connecting-rod, attached to the cutting-table $f$ and giving motion to the rocking lever $n'$.

$n^2$ and $n^3$ are rods attached to $n'$ and give the forward movement to the lever $n^4$, to which are attached the pawls $n^5$ $n^6$. A backward movement of the lever $n^4$ lifts the pawls $n^5$ $n^6$ out of gear with the ratchet-wheels $n^a$.

$n^7$ is a weighted lever for giving the backward movement to the lever $n^4$.

$n^8$ $n^9$ are bevel-wheels with ratchets $n^a$ attached, said wheels being loose on their spindle and gearing into bevel-pinion $n^{10}$, which is fixed on its spindle. Also fixed on said spindle is a spur-wheel $n^{11}$, which gears into a rack $n^{12}$, cast on the bracket $n^{13}$, said bracket carrying rollers $l'$ $m$ $m^2$ and the sheet $b$ and having projections $n^{14}$, which fit into a groove in the end of roller $l$, and as the bracket $n^{13}$ is made by means of the gearing to travel backward and forward it gives like transverse movement to rollers carrying the secondary sheet $b$, the backward and forward movement depending upon which pawl is in gearing with the ratchet attached to the bevel-wheels $n^8$ $n^9$, the movement of the pawls $n^5$ $n^6$ being regulated by the pawl $n^{15}$ and ratchet $n^{17}$ and projections on the cam on same axis. The projections on the cam $n^{17}$ may be varied to give a longer or a shorter movement to the sheet $b$, and thus suit different patterns.

$o$, Fig. 2, is the rocking lever, attached to the table $f'$, for giving motion to the connecting-rod $o'$, which moves the rocking lever $o^2$, to which is attached the pawl $c^7$, for giving intermittent movement to the drum $c^4$. Also attached to lever $o^2$ is a connecting-rod $o^3$, which gives movement to the ratchet-pawl $o^4$, centered on lever $o^5$.

$o^6$ is a ratchet-wheel for giving intermittent motion to the spur-wheel $o^7$ and pinion-wheel $o^8$, mounted on rollers $o^9$. The rollers are moved intermittently by the action of the wheels $o^7$ $o^8$ and carry the finished sheet from under the hydraulic press.

P, Fig. 2$^a$, is a disk with slots $p'$ around the rim. Into said slots a stop $p^2$ fits. The stop $p^2$ works in guides $p^3$ and is moved intermittently by the rocking lever $p^4$, which is operated by connecting-rod $p^5$ $p^6$, having a slotted end $p^6$ and being attached to a pin $p^7$, Fig. 5, fixed in spur-wheel $p^8$. The disk P is fixed on shaft $c^8$ and is moved intermittently by means of the ratchet-wheel $c^6$ and pawl $c^7$, connected to the rocking arms $o^2$.

$p^9$ and $p^{10}$ are pedestals adjustably bolted to framing C, in which the shafts $c^8$ are journaled.

$q$ is a hydraulic press with two rams $q'$ attached to a beam $q^2$. $q^3$ is a table for the same, the movements of the press being controlled by suitable mechanism. (Not shown.) $q^3$ is provided with a chamber, so that it may be steam-heated, if found necessary.

$r$, Figs. 1$^a$ and 2$^a$, is a roller with pinion $r'$ on each end and gearing into racks $r^2$. The connecting-link $r^4$ is connected to the roller $r$ and the rocking lever $r^3$.

$r^5$ is a connecting-rod from $r^3$ to pin $r^6$ in disk $r^7$, Figs. 4 and 5, fixed on shaft $r^8$. On said shaft $r^8$, but sliding on a feather or key, is a clutch $r^9$, which fits into a similar clutch $r^{10}$, the same being attached to spur-pinion $r^{11}$, but loose on shaft $r^8$.

$r^{12}$ is a spur-wheel which gears into $r^{11}$.

Fixed on spindle $s$, Figs. 1$^a$ and 5, and fitting into the clutch $r^9$ is a clutch-rod $s'$, which moves the clutch $r^9$ backward and forward.

$s^2$ is a toggle-joint, one end of which is attached to the rod $s'$ and the other end to the framing C by suitable pins.

$s^3$ is a cam cast on $r^9$, which causes the rod $s'$ to disengage clutch $r^9$.

$s^4$ is a weighted lever for causing the rod $s'$ to put the clutch $r^9$ into gear with $s^5$ represents suitable brackets fixed to the framing C for carrying $s$.

$t$ and $t'$ are the calendering or finishing rolls. They are made to be steam-heated, if found to be necessary. These are driven at a constant speed by means of the driving-cones $t^2$ and the belt-pulleys $t^3$ $t^4$.

$t^5$ is a bush carrying the roller $t$ and sliding in a suitable bracket $t^6$, fitted with a screw and hand-wheel $t^7$, so that the pressure between the rolls $t$ and $t'$ may be varied.

Figure 4A:
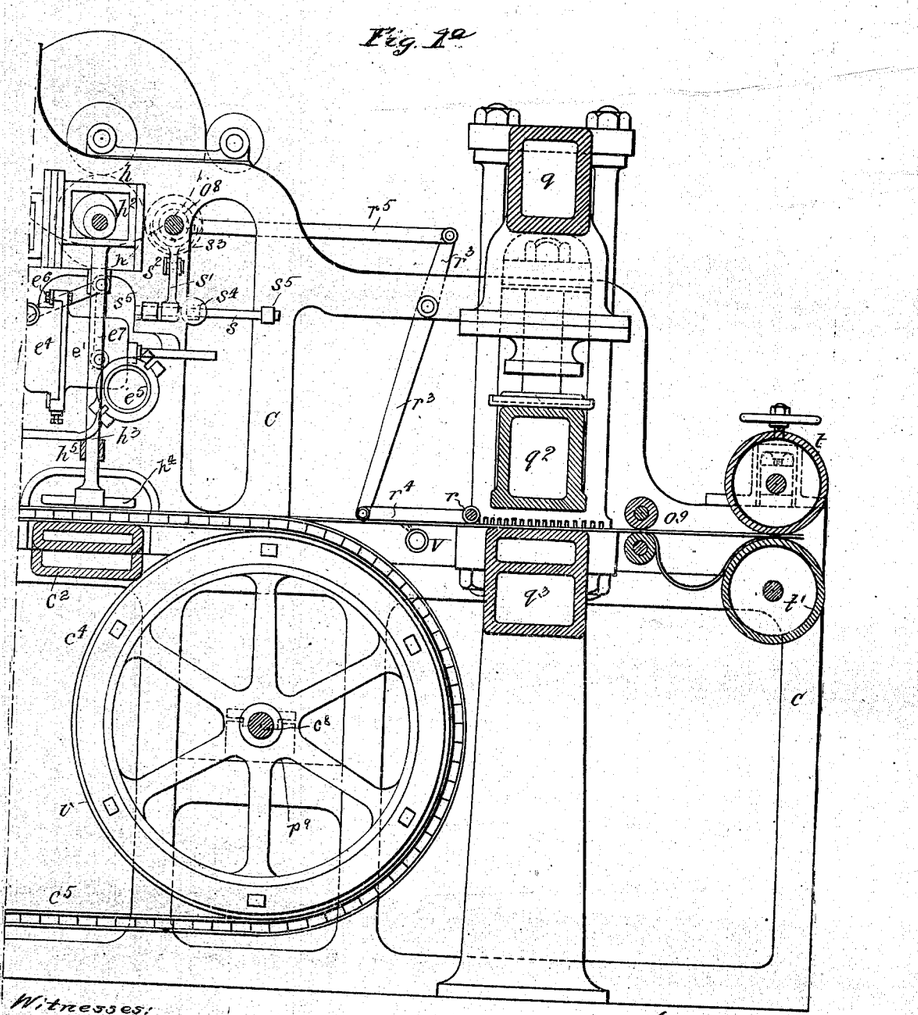

$u$, Fig. 4$^a$, is the driving-pulley, and $u'$ $u^2$ $u^3$, &c., the spur-gearing.

V, Fig. 1ª, is a water-spray pipe for damping the under side of the canvas web before pressing should it be found necessary.

Figure 8:
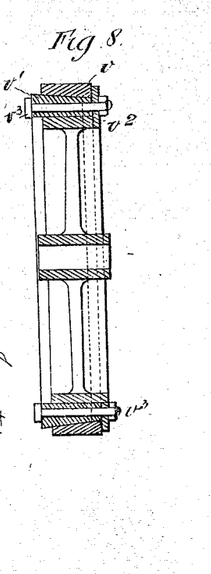
Fig. 8 is a section of the drum for carrying the traveling table or platen.

Fig. 8 is a section of the drums $c^3$ $c^4$. $v$ is the loose rim, of expansive metal; $v'$, the expansion-ring, of cast-iron; $v^2$, the drum; $v^3$, the bolts for drawing up the expansion-ring and enlarging the diameter of ring $v$ as required. The section clearly shows the manner in which the drum is built.

Figure 11:
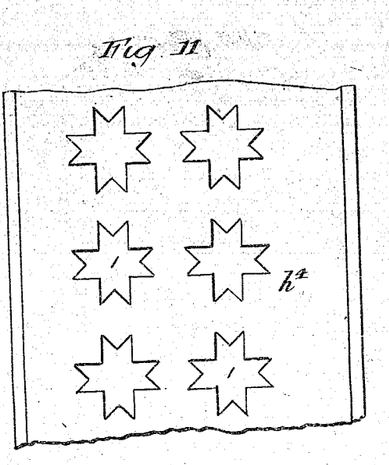
Figs. 11 to 19 are views of details to be hereinafter described.
Figure 19:
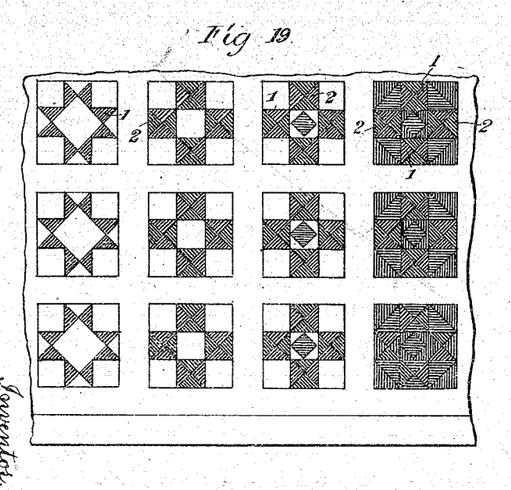

Fig. 11 is a plan of the pattern-plate $h^4$, showing the holes in the plate which act as guides for the dies $e^2$ for cutting out and laying on part 1 of the pattern shown in Fig. 19.

Figure 13:
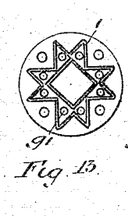
Figure 14:
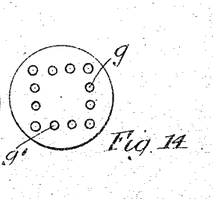

Figs. 13 and 14 are top and bottom views of die $e^2$, also guides for the ejectors $g'$ $g^2$, &c., for part 1 of the pattern shown in Fig. 19.

Figure 12:
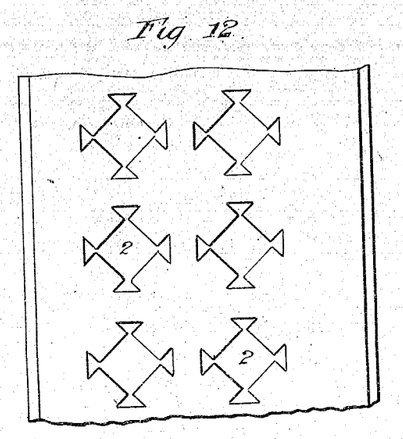

Fig. 12 is a plan of the pattern-plate $h^4$, showing the holes in the plate, which act as guides for the dies $e^2$ for cutting out and laying on part 2 of the pattern shown in Fig. 19.

Figure 15:
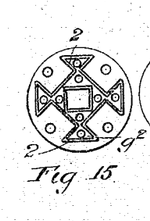
Figure 16:
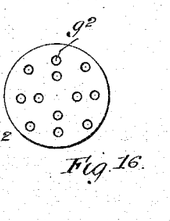

Figs. 15 and 16 are top and bottom views of die $e^2$, showing guides for the ejectors $g'$ $g^2$, &c., for part 2 of the pattern shown in Fig. 19.

Fig. 19 shows the method of manufacturing the mosaic from the perforated primary sheet, the perforations being inlaid with one or more different-colored pieces of linoleum, the first set of dies putting in color No. 1, the second set color No. 2, color after color being added till the complete pattern is laid.

Figure 17:
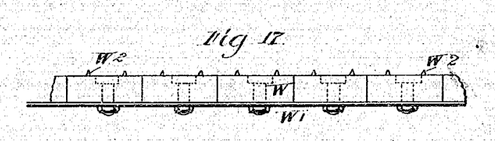
Figure 18:
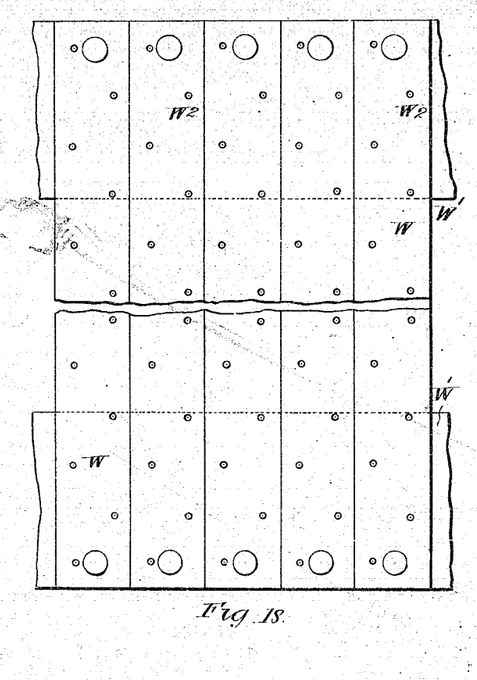

Figs. 17 and 18 are respectively a side elevation and a plan of a portion of the traveling table or platen. The platen consists of a series of transverse strips of wood W, connected to two metallic bands W', and in order to cause the canvas $k$ to move at the same rate as the platen the latter is provided with a series of pins $W^2$ upon its surface, said pins engaging with the canvas web and drawing it forward as the platen is moved.

The foregoing describes fully the operation of making and placing in position the parts forming a floor-cloth composed of a primary perforated web and inlaid mosaic.

Figure 20:
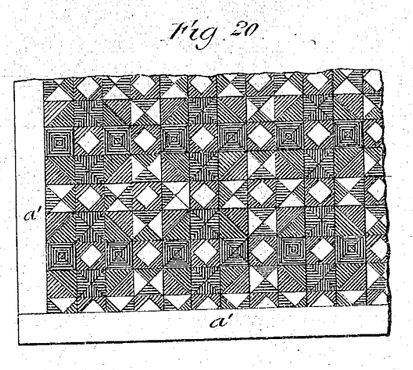
Fig. 20 is a detail view of a portion of the mosaic.

The machine is also designed to build the whole floor-cloth from sections of any desired pattern. In this latter case the first portion of the machine for feeding in, perforating, and placing the primary sheet in position on the platen is thrown out of gear and remains unused. The requisite cutter and die-plates are placed in their respective heads to form the complete pattern, and in lieu of the primary sheet a selvage or edge of linoleum $a'$, Fig. 20, is placed on the platen and the whole number of sections forming the pattern then being inserted between these strips, all as fully described. The construction of the sheet built up entirely is clearly shown in Fig. 20.

The operation of the whole apparatus is fully described as follows: To make the complete sheet by combination of a primary perforated sheet or web and the insertion therein of pieces of various forms and colors. The rolls of linoleum $b$ $b'$ are the secondary sheets. $a$ is the primary, and $a'$, Fig. 3, the strip for forming the edge of the sheet. $k$ is the canvas backing. These having been placed in their proper positions, and the head $d$, carrying the primary sheet-cutters, being in its highest position, the canvas backing $k$, passing around $k'$ and $k^2$, is drawn forward by means of the traveling platen $c^5$, driven by the ratchet-wheel $c^6$, Fig. 2ª, and pawl $c^7$. At the same time the primary sheet $a$ and strip $a'$ are also drawn forward under the press-head $d$ with the cutters $d'$. The platen then rests, and during the interval of rest the head descends and perforates the sheet $a$, the perforations passing upward through the cutters $d'$ to the inside of the blocks $d^2$, from which they are ejected by a traveling band $d^9$ through opening $d^3$, Fig. 5. The head is now raised by means of the toggle-joints $d^3$, box-slides $d^4$, and cams $d^5$, and the perforated sheet is drawn forward between rollers $j^6$ $j^7$ and platen $c^5$ a length equal to a pitch of the pattern, where it again rests. The primary sheet and the canvas-backing rolls are arranged by means of cones to be driven at a constant speed sufficient to allow of the length of either equal to the pitch of the pattern to be unrolled between the intermittent movements of the platen. At the same time as the primary sheet is being perforated the pieces or tesseræ from the secondary sheets $b$ $b'$ are being cut, the heads $e$ $e'$ being held in a horizontal position by means of the lever $e^6$ and link $e^7$, the cutting-tables $f$ $f'$ being moved forward against the heads $e$ $e'$ and cutters $e^2$ and cut out the various pieces. The tables $f$ $f'$ are then drawn backward, taking the webs $b$ $b'$ with them by means of the guide-plates $f^3$. The presses or heads $e$ $e'$ being now turned from a horizontal to a vertical position are directly over the perforations made in the primary sheet. Immediately before the heads $e$ $e'$ come to rest in the vertical position the cam $h^6$ comes into operation and presses down the pattern guide-plate $h^4$ onto the top of the primary sheet, compressing the springs $h^7$, Fig. 5. The cams $h^2$ now come into operation and bring down the beam $h$ onto the spindles $g^4$, Fig. 5, compressing the springs $g^5$ and forcing down the ejectors $g'$ $g^2$, Fig. 9, and ejecting the tesseræ through the pattern guide-plate $h^4$, compressing them onto the canvas backing and inserting them in their proper positions in the perforations. While the ejectors hold the tesseræ in position the cams $h^6$ pass off the guide-rods $h^3$ and allow the pattern-plate $h^4$ to rise by the action of the springs $h^7$. The cam $h^2$ now lifts the beam $h$, and the springs $g^5$ raise the ejectors to their highest position. The heads $e$ $e'$ are now returned from the vertical to the horizontal position in readiness for the next operation of cutting. During the time that the tesseræ were being ejected the secondary sheets $b$ $b'$ were being drawn downward a length equal to a pitch of the pattern, and the scrap or waste perforated sheet was being rolled on the rollers $m$ $m'$.

The following explanation of the operation of moving one sheet one pitch will do for the others: On the forward movement of the table $f$, to which the rod $l^7$ is attached, Fig. 2, the pawl $l^8$ pulls around the ratchet-wheel and cam $l^4$. The weighted lever $l^{10}$ pulls over the lever $l^9$, which carries the pawl $l^3$. The lever $l^9$ rests on the cam $l^{12}$. Projections are made on the edge of this cam to give any desired length of stroke to the pawl $l^3$, and this regulates the movement of the sheet $b$ to suit the pattern being cut. On the backward movement of the table the pawl $l^3$ moves the roller $l$ the required distance, carrying the web $b$ with it. The action of rolling the sheet off the roller $l$ rolls the scrap onto the roller $m$. It is sometimes necessary to give the sheet a transverse movement, as well as a downward, in order to use up as much of the material as possible. In Figs. 6 and 7 is shown the gearing for this purpose. On the forward movement of the table $f$, to which the rod $n$ is attached, the pawl $n^{15}$ pulls around the ratchet-wheel $n^{16}$ and cam $n^{17}$, the shape of the face of the cam regulating the length of the stroke. As the weighted lever $n^1$ pulls the lever $n^4$ over against the face of the cam the projections on the side of the cam come into contact with either of the rods $n^2$ or $n^3$ and by means of the upturned point lift either of pawls $n^5$ or $n^6$ out of gear with its ratchet-wheel, depending on the direction of motion to be given to the sheet, or if no transverse motion at any part struck is to be given to the sheet both pawls will be put out of gear. Suppose the pawl $n^6$, Fig. 4, is in gear. It will turn the bevel and spur wheels $n^{10}$ $n^{11}$ in gear with the rack $n^{12}$, so as to move the sheet from right to left, and if the pawl $n^5$ is in gear the movement would be from left to right. These movements downward and transverse to the web or sheet can be arranged to take place at the same or different times, as the pattern may require. To insure an exact movement of the platen, the pawl $c^7$ and ratchet-wheel $c^6$, Fig. 2ª, are arranged to move the platen a little less than the correct pitch. The stop $p^2$ is then forced into one of the slots $p'$, which are equal in pitch around the rim of the disk P. The stop brings around the disk to the same position each movement, and thus regulates the travel of the drums carrying the platen. After the sheet has been completely built it is drawn under a hydraulic press $q^2$ by means of the rollers $o^9$, driven intermittently by the pawl $o^4$, connected to the rod $o^3$. When the sheet has been subjected to a pressure sufficient to make the pieces of mosaic cohere to each other and adhere to the canvas backing, it is passed between the rollers $t$ $t'$, (which may be heated, if necessary,) which give it a further and finishing pressure. The sheet comes from under the press intermittently, but the rollers by means of the cones $t^2$ are driven at a constant speed just sufficient to take in the sheet as it comes from the press. After the hydraulic press has been lifted off the sheet and before the forward movement of the sheet the roller $r$ is driven rapidly forward between the press and the sheet, so as to roll the sheet off the face of the press should it tend to stick after pressure. The roller $r$ is driven rapidly and intermittently by means of the pinion $r^{11}$ and clutch $r^9$ and $r^{10}$, Fig. 4, which drives the disk $r^5$, connected to the rod $r^5$, and the rocking lever $r^8$ and link $r^4$.

The cutters or dies $e^2$ and heads or beams $e$ $e'$ are changed from a vertical to a horizontal position in the following manner: The heads or beams are hung on trunnions $e^5$. Referring to Figs. 1 and 1ª, it will be seen that the head or beam $e'$ nearest the front end of the machine is in a vertical position. In the course of the operation of the machine the cam $e^{10}$ is turned, thereby pushing the link $e^8$ down and depressing the forward end of the lever $e^6$, suitably pivoted. The rear end of the lever $e^6$ is pivoted to a link $e^7$, which in turn is pivoted to the head $e'$, said pivot connection between the link $e^7$ and head being in advance of the trunnions $e^5$. The forward end of lever $e^6$ being depressed, the rear end will be raised, thus pulling upward on the link $e^7$, thereby raising the head $e'$ to a horizontal position, the cam $e^{10}$ now being in its highest position.

Having thus described my invention, what I claim as new therein, and desire to secure by Letters Patent, is—

1. In a linoleum-machine of the character described, the combination with means carrying a primary sheet, the hollow beam or head provided on its lower face with the perforating means or cutters, and suitable means for moving said head to and from the primary sheet; of a movable belt located within the hollow head for removing the cut pieces from the head, substantially as shown and described.

2. In a linoleum-machine, the combination of the traveling table $c^5$, means for perforating a primary sheet and feeding same onto said table, a movable table, and the oscillating knives for cutting the pattern-pieces and then depositing them on the perforated primary sheet, substantially as shown and described.

3. In a linoleum-machine, the combination of the traveling table $c^5$, means for perforating a primary sheet and feeding same onto said table, means for feeding a secondary sheet, a movable table having a soft-metal facing, the guard-plates located in front of said table, and the oscillating cutting-knives for cutting the pattern-pieces, substantially as shown and described.

4. In a linoleum-machine of the character described, the oscillating knives, and the spring-actuated plungers carried by the cutting-knives to push the cut pieces from the knives when the knives are moving in a vertical direction, substantially as shown and described.

5. In a linoleum-machine of the character described, the combination of the traveling table, the oscillating knives for cutting pattern-pieces from a secondary sheet and depositing them on a primary perforated sheet, and the pattern-plate $h^4$ adapted to be operated to press on the traveling table when the cutting-knives are oscillating, and a cam for operating said pattern-plate and a spring for returning it to normal position, substantially as shown and described.

6. In a linoleum-machine, the combination of the traveling table, drums over which said table passes, suitable means in connection with said table for moving it, a spur-wheel also carried by said drum and having means in connection therewith for locking it after the table has been moved the required distance, substantially as shown and described.

7. In a linoleum-machine, the combination of means for feeding a primary sheet, of a vertically-sliding beam or head provided on its lower face with the perforating or cutting means for cutting the primary sheet, and means for feeding a secondary sheet and cutting pattern-pieces therefrom and depositing said pattern-pieces on the primary sheet; substantially as described.

8. The combination with the cutting-table $f$ and guide-rollers $l$, $l'$ of the ratchet-wheel on one of said rollers, lever $l^5$ having a suitable fulcrum, the lever $l^6$ pivoted to the upper end of lever $l^5$, the weighted member $l^9$ provided with a cam-slot in which a stud on one end of the lever $l^6$ works, a pawl pivoted to the top of the member $l^9$ and engaging the ratchet-wheel on the guide-roller $l$, a cam pivoted between the lever $l^6$ and member $l^9$ to limit the movement of said member, a ratchet-wheel secured on the shaft of said cam and controlled by a pawl pivoted on the lever $l^5$, and a lever $l^7$ connecting the said cutting-table and lever $l^5$, substantially as described.

In testimony whereof I have signed my name to this specification in the presence of two witnesses.

DAVID ESPLIN THOMSON.

Witnesses:
JOHN SIDDLE,
ARTHUR HARTLEY YUILE.